United States Patent
Holbrook et al.

(10) Patent No.: US 10,708,272 B1
(45) Date of Patent: Jul. 7, 2020

(54) OPTIMIZED HASH-BASED ACL LOOKUP OFFLOAD

(71) Applicant: Arista Networks, Inc., Santa Clara, CA (US)

(72) Inventors: Hugh W. Holbrook, Palo Alto, CA (US); Francois Labonte, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 242 days.

(21) Appl. No.: 15/799,821

(22) Filed: Oct. 31, 2017

Related U.S. Application Data

(60) Provisional application No. 62/457,799, filed on Feb. 10, 2017.

(51) Int. Cl.
*H04L 29/06* (2006.01)
*H04L 9/32* (2006.01)
*H04L 9/06* (2006.01)

(52) U.S. Cl.
CPC .......... *H04L 63/101* (2013.01); *H04L 9/0643* (2013.01); *H04L 9/3242* (2013.01); *H04L 63/105* (2013.01)

(58) Field of Classification Search
CPC ............................ H04L 9/0643; H04L 63/101
See application file for complete search history.

(56) References Cited

U.S. PATENT DOCUMENTS

| | | | |
|---|---|---|---|
| 6,757,742 B1 * | 6/2004 | Viswanath | H04L 29/12018 370/389 |
| 7,002,965 B1 | 2/2006 | Cheriton | |
| 7,249,228 B1 | 7/2007 | Agarwal et al. | |
| 7,324,514 B1 * | 1/2008 | Haq | H04L 12/66 370/392 |
| 7,657,706 B2 * | 2/2010 | Iyer | G06F 12/0223 711/109 |
| 8,621,211 B1 * | 12/2013 | Kishore | H04L 63/20 713/168 |
| 8,689,284 B2 | 4/2014 | Roberts et al. | |
| 8,700,771 B1 | 4/2014 | Ramankutty et al. | |
| 8,798,057 B1 * | 8/2014 | Goel | H04L 45/302 370/392 |

(Continued)

OTHER PUBLICATIONS

U.S. Appl. No. 13/852,863, filed Mar. 28, 2013, titled "System and Method for Access Control List Conversion", by inventors Adam James Sweeney and Asang Kamalakar Dani, 30 pages (specification and drawings).

(Continued)

*Primary Examiner* — Ali Shayanfar
(74) *Attorney, Agent, or Firm* — Haley Guiliano LLP

(57) ABSTRACT

Described herein are various embodiments of a network element including an access control list processing module to process an access control list of the network element. In one embodiment, the access control list processing module converts the access control list into set of subsections of rules, where each rule of a subsection mutually exclusive of each other rule in the subsection. The network element may then make forwarding decisions for network data using the set of subsections of rules. In one embodiment, semantics preserving transformations can be applied to rules and data to enable more efficient processing of filtering or rules.

42 Claims, 14 Drawing Sheets

(56) References Cited

U.S. PATENT DOCUMENTS

| | | | |
|---|---|---|---|
| 9,215,205 B1* | 12/2015 | Smith | H04L 61/1511 |
| 9,331,937 B2* | 5/2016 | Koponen | H04L 41/0893 |
| 9,882,766 B2 | 1/2018 | Sweeney et al. | |
| 10,587,516 B1* | 3/2020 | Arad | G06F 16/242 |
| 2001/0011259 A1 | 8/2001 | Howard | |
| 2003/0110192 A1 | 6/2003 | Valente et al. | |
| 2003/0172205 A1* | 9/2003 | Bastian | G06C 15/00 |
| | | | 710/45 |
| 2006/0184492 A1 | 8/2006 | Long et al. | |
| 2007/0143851 A1 | 6/2007 | Nicodemus et al. | |
| 2009/0031129 A1* | 1/2009 | Milliken | G06F 21/562 |
| | | | 713/168 |
| 2009/0052456 A1* | 2/2009 | Lu | H04L 45/00 |
| | | | 370/392 |
| 2009/0234841 A1 | 9/2009 | Watanabe | |
| 2010/0110915 A1 | 5/2010 | Mortensen et al. | |
| 2010/0175124 A1 | 7/2010 | Miranda | |
| 2010/0274584 A1 | 10/2010 | Kim | |
| 2010/0299741 A1 | 11/2010 | Harrison et al. | |
| 2011/0060713 A1 | 3/2011 | Harrison et al. | |
| 2011/0283348 A1 | 11/2011 | Ling et al. | |
| 2013/0242993 A1 | 9/2013 | Basso et al. | |
| 2013/0301641 A1 | 11/2013 | Anand et al. | |
| 2014/0082176 A1* | 3/2014 | Basso | G06F 15/167 |
| | | | 709/224 |
| 2015/0010000 A1* | 1/2015 | Zhang | H04L 45/38 |
| | | | 370/392 |
| 2015/0263889 A1* | 9/2015 | Newton | H04L 47/10 |
| | | | 370/254 |
| 2015/0309184 A1 | 10/2015 | Viscovic et al. | |
| 2017/0163575 A1* | 6/2017 | Wang | H04L 49/9094 |
| 2018/0082076 A1* | 3/2018 | Murray | H04L 9/0631 |
| 2019/0182367 A1* | 6/2019 | Kim | H04L 45/26 |

OTHER PUBLICATIONS

Non-Final Office Action dated Oct. 18, 2018 of U.S. Appl. No. 15/272,083.
Final Office Action dated Mar. 26, 2019 of U.S. Appl. No. 15/272,083.
Non-Final Office Action dated Nov. 22, 2019 of U.S. Appl. No. 15/272,083.
Reply to Non-Final Office Action dated Oct. 18, 2018 of U.S. Appl. No. 15/272,083, filed Jan. 18, 2019.
Reply to Final Office Action dated Mar. 26, 2019 of U.S. Appl. No. 15/272,083, filed Sep. 26, 2019.

* cited by examiner

US 10,708,272 B1

OPTIMIZED HASH-BASED ACL LOOKUP OFFLOAD

RELATED APPLICATIONS

The present application is related to co-pending application Ser. No. 15/272,083, filed on Sep. 21, 2016, and claims the benefit of priority of prior, provisional application Ser. No. 62/457,799, filed Feb. 10, 2017, the entirety of which is hereby incorporated herein by reference.

FIELD OF INVENTION

Embodiments relate generally to data networking and more particularly to performing network data classification and access control using hashed-based lookup offload.

BACKGROUND OF THE INVENTION

An Access Control List (ACL) is a special case of a network data (e.g., packet) classification tool that consists of an ordered series of rules, where each rule has a match criterion and an action. An ACL is applied to a piece of data by evaluating the data against these rules in order and taking the action of the first rule that matched. For example, a match criterion for each rule is a pair (V, M), where V is a numeric value up to N bits long and M is a mask of N bits having a binary value of 0 or 1. A value X matches the rule if (X & M)==(V & M), where "&" is the bitwise "logical and" operator.

In one example, the values (X) matched against an ACL are Internet Protocol (IP) v4 or IPv6 addresses. In this example, the (V, M) pairs match subsets of the IPv4 or IPv6 address space, and the actions of an ACL are either "permit" or "deny". Also, each ACL is terminated by an "implicit deny" rule at the end equivalent to "deny (0, 0)," which denies every address that is not explicitly covered by another preceding rule in the ACL.

In addition, because the ACL is ordered, preceding rules in the ACL can overrule some or all of a subsequent rule for overlapping ranges of addresses. For example, if the ordered rules are "permit 128.1.1.0/24, permit 128.1.2.0/24, and deny 128.1.0.0/20," because the permit rules are ordered higher in the ACL, the permit rules overrule the overlapping address ranges of the deny rule. As a result, the addresses are permitted by this ACL are "128.1.1.0-128.1.2.255" and the addresses denied are "128.1.0.0-128.1.0.255" and "128.1.3.0-128.1.255.255". One problem with an ordered ACL is that the ACL can includes hundreds or thousands of rules and evaluating this ACL can require complicated hardware resources of the network element, such as a ternary content addressable memory (TCAM) that is used to evaluate the ordered rules.

SUMMARY OF THE DESCRIPTION

Described herein are various embodiments to process and encode access control entries within an access control list and process the encoded access control entries using a hash-based ACL lookup offload engine within a network element.

One embodiment provides for a non-transitory machine-readable medium having executable instructions to cause one or more processing units to perform operations to convert an ordered access control list into a set of subsections of access control entries, the operations comprising receiving an access control list of access control entries, wherein each of the access control entries includes a network data characteristic and an action; converting a first portion of the access control list into a first set of subsections of rules, wherein each rule of a subsection is mutually exclusive of each other rule in the subsection; storing a second portion of the access control list into an associative data structure including a set of entries and masks; and storing a description of each of the subsections in the set of subsections of rules, wherein the descriptions and the subsection of rules is used by the network element to make packet processing decision for the network data.

One embodiment provides for a network element including an access control list processing module to process an access control list associated with the network element, the access control list processing module to convert the access control list into multiple sets of subsections of rules, each rule of a subsection mutually exclusive of each other rule in the subsection; and packet processing logic to make packet processing decisions for network data received via a port of the network element using the set of subsections of rules, the packet processing logic to evaluate a first set of subsections of rules stored in one or more hash tables and a second set of subsections of rules in an associative data structure including a set of entries and masks.

One embodiment provides for a network processing system including memory to store a processed access control list, the processed access control list including multiple sets of subsections of rules, each rule of a subsection mutually exclusive of each other rule in the subsection; one or more hash tables to store hash values associated with one or more of the multiple sets of subsections of rules; one or more processors to apply a transformed access control list to network data within a network element, the processors including logic to load a description of a first subsection of the transformed access control list, evaluate each rule in the first subsection by performing a lookup in the hardware hash table for a hash of a masked flow label associated with the network data, load a description of a second subsection of the transformed access control list, and compare a matching rule result from the first subsection against a matching rule result from the second subsection; and logic to perform an action on a unit of network data based on a matching rule result from the first subsection or the second subsection.

Other methods and apparatuses are also described, including various optimizations that may be performed during the processing of the access control list.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
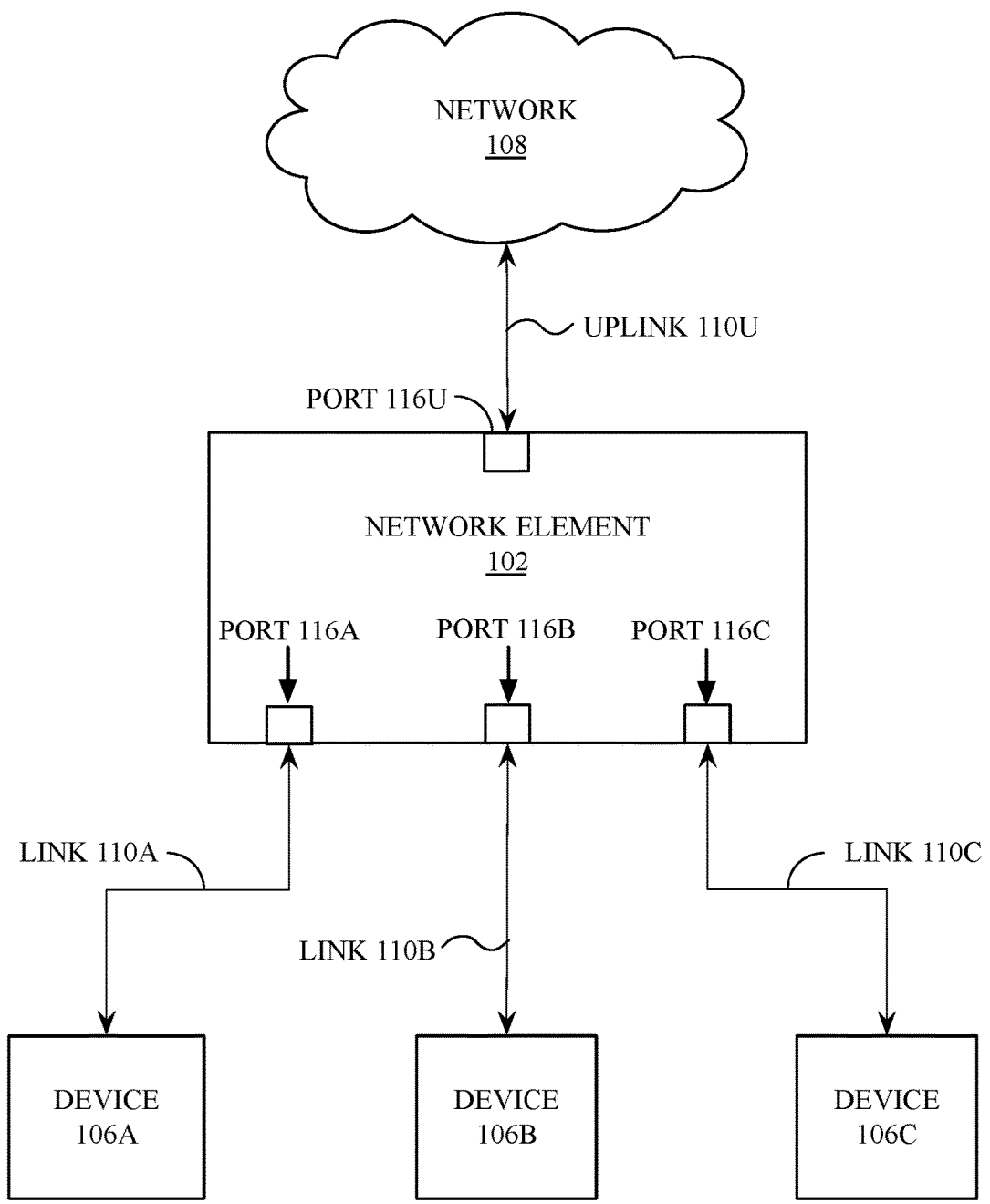
FIG. 1 is a block diagram of one embodiment of a system that includes a network element communicating network data between a network and a number of devices.

Embodiments described herein provide hash-based ACL lookup offload hardware for performing ACL operations on network data within a network element. To avoid the use of expensive TCAM hardware, one embodiment provides for an ACL processing module that converts an arbitrary ACL of ordered rules into contiguous subsections, with each subsection consisting of rules with the same mask. The rules in each such subsection are then loaded into a hardware hash table that looks up the unmasked fields of the packet that are associated with that subsection, and either retrieves an indication of the desired result {permit, deny, set traffic class, set next hop, increment a counter, select a queue, select a policier, set packet rewrite action, etc.} or does not receive any results. Thus, a TCAM based approach of evaluating ACLs can be replaced by a software/hardware-based approach that includes processing the ACL and performing lookups on the processed ACL using the hash-based ACL lookup offload engine. The processing of the ACL can be performed by the network element or another device, such as a network management station (NMS), a software defined network controller, or another device in the network.

One embodiment provides hardware support for at least 16,000 160-bit ACLs. Many of the access control entries in the ACL may not require the full width of the hash table in hardware, so the actual number of ACLs supported may be larger. Support is provided for multiple ACL types including quality of service ACLs, policy based routing ACLs, and security ACLs. The processing results of the different types of ACLs may be differently encoded. Various network address protocols are supported and addresses or address ranges may be specified, for example, as Internet Protocol (IP) addresses (e.g., IPv4, IPv6), MAC addresses, Transmission Control Protocol (TCP) ports, User Datagram Protocol (UDP) ports, other types of ports, time-to-live values (TTL), protocols, and/or other types of network characteristics that can have a range. In one embodiment, a MAC address can be specified in an ACL entry.

To provide a thorough explanation of the various embodiments, numerous specific details are set forth herein. However, one having ordinary skill in the art will understand that embodiments may be practiced without these specific details. In some instances, well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network system 100 that includes a network element 102 communicating network data between a network 108 and a number of devices 106A-C. In various embodiments, the network 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines. In one embodiment, the network element 102 can also be a virtual machine.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. As described herein, where individual elements of network data are referenced (e.g., frames, datagrams, or packets, etc.) the techniques described are applicable to any discretely switched network data form of network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

Figure 2:
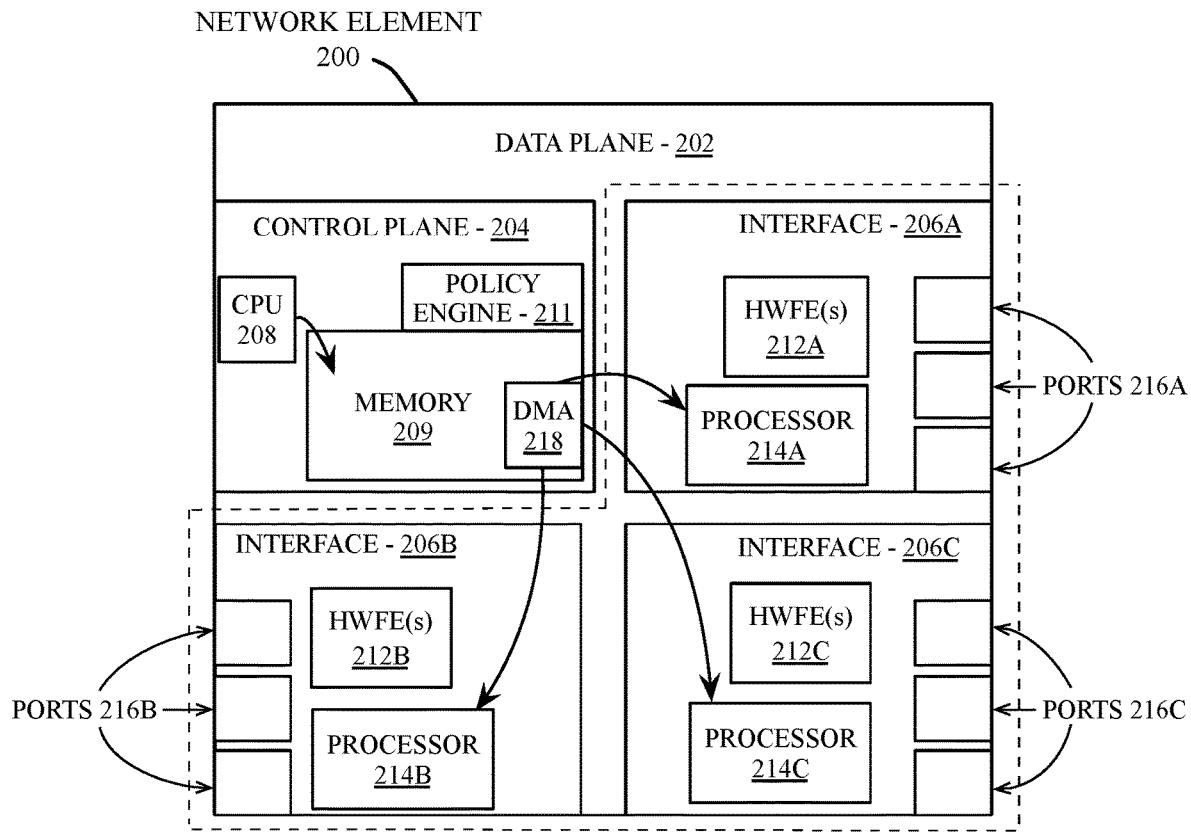
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and writes configuration data for hardware forwarding engines 212A-C in the network interface devices 206A-C. Additionally, the CPU can read data from the hardware forwarding engines 212A-C. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C includes multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, performing routing, switching, or other types of network forwarding. Each processor 214A-C can be used to accelerate various functions of the interface devices 206A-C. For example and in one embodiment, the processors 214A-C can be configured to program corresponding hardware forwarding engines 212A-C. The processors 214A-C can also push data from the hardware forwarding engines 212A-C to a CPU 208 in the control plane 204.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C.

In one embodiment, the memory 209 that is used to store data for the control plane 204 is shared with the data plane 202. In such embodiment a direct memory access (DMA) controller 218 is coupled to the memory 209 to allow processors 214A-C direct access to the memory 209. In one embodiment, the DMA controller 218 allows the processors 214A to directly access the memory 209 without requiring the CPU 208 in the control plane 204 to send data to each processor 214A-C. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Forwarding Engine Pipeline

Figure 3:
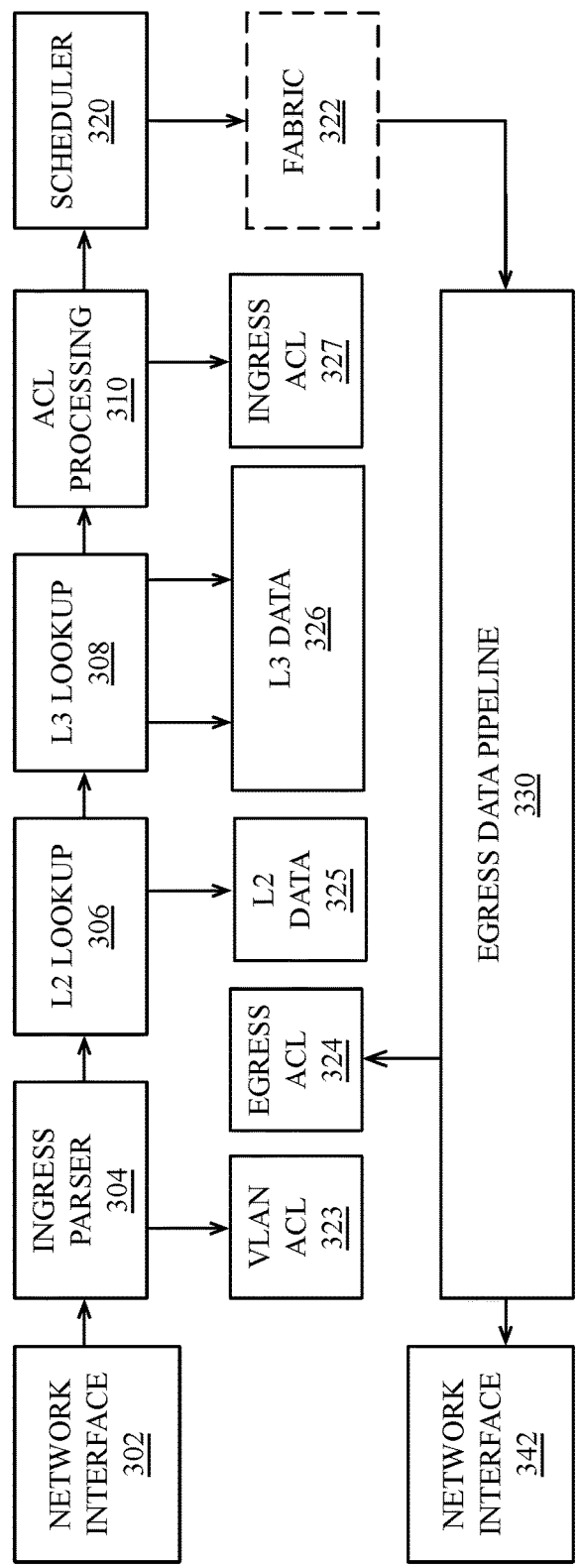
FIG. 3 is a block diagram of a forwarding pipeline within one embodiment of a network element.

FIG. 3 is a block diagram of a forwarding pipeline 300 within one embodiment of a network element. In one embodiment, the forwarding pipeline 300 resides in a hardware forwarding engine (e.g., HWFE 212), which includes logic from one or more of the HWFE(s) 212 within each interface 206 shown in FIG. 2. FIG. 3 focuses primarily on the ingress aspects of the forwarding pipeline 300, where the relevant logic of the various embodiments resides. As illustrated, the forwarding pipeline 300 includes an ingress network interface 302, an ingress parser 304, a data-link layer lookup (e.g., L2 lookup 306), a network layer lookup (e.g., L3 lookup 308), an access control list (ACL) processing block 310, and a scheduler 320. In one embodiment, the ACL processing block 310 includes ACL processing logic as described herein.

Access control lists including a VLAN ACL 323, Ingress routed ACL and QOS ACL or policy based routing 327, and Egress ACL 324 allow policy and filtering actions to be performed on network data at multiple stages within the forwarding pipeline 300. The ACLs store an ordered list of rules that define access restrictions for entities of the network element, including a specified network interface (e.g., ingress network interface 302, egress network interface 342). In one embodiment, network data may be forwarded to the control plane of the network element, and an ACL can be configured to specify access restrictions to the control plane. The ACL rules specify the data to which fields of network data are compared. In one embodiment, each of the ACL rules can be a permit rule, a deny rule, a policing rule, a counting rule, a queue selection rule, a nexthop selection rule, a quality of service rule, a packet rewrite rule, and/or a combination thereof.

In one embodiment the forwarding pipeline 300 is configured to forward units of network data that match all conditions in a permit rule and to drop units of network data that match all conditions in a deny rule. For some ACLs, the forwarding pipeline is configured to implicitly deny (e.g., drop) units of network data that do not match at least one rule. Upon arrival at the ingress network interface 302, a unit of network data is processed based one or more ingress ACLs associated with the network interface 302 (e.g., VLAN ACL 323, Ingress ACL 327). In one embodiment, the network data can be additionally processed based on the egress ACL 324 before being forwarded via the egress network interface 342. In one embodiment, the ACLs can be used to perform actions other than permit and deny. For example, an access control entry may be specified which sets a traffic class for a unit of network data or sets a next hop for a unit of network data or a policer to be applied to the networks data.

If a unit of network data is permitted through ACL processing, a forwarding decision can be made for the data. The L2 data 325 and L3 data 326 modules store various tables used to perform data-link layer (layer 2) and network layer (layer 3) forwarding of network data by the forwarding pipeline 300. In one embodiment, after processing and forwarding operations are performed by ingress elements of the forwarding pipeline, the scheduler 320 forwards ingress network data to a fabric module 322, which provides data-plane connectivity between multiple packet processors in the network element. In one embodiment a single chip solution is used for the ingress and egress pipelines of the forwarding pipeline 300, omitting the fabric module 322. Either through the fabric module 322 or via a scheduling engine, the scheduler 320 can forward the ingress network data to the egress data pipeline 330 for egress processing once the set of forwarding decisions have been made. The egress data, after processing by the egress data pipeline 330, is re-transmitted via an egress network interface 342. The egress data pipeline 330 can operate in parallel with other elements of the forwarding pipeline 300 described herein.

In one embodiment, forwarding operations for a unit of network data proceed as follows. First, the network data is received by an ingress network interface 302. For embodiments including Ethernet interfaces, the network interface 302 includes a physical layer (PHY) and a media access control (MAC) layer. The PHY layer is responsible for transmission and reception of bit streams across physical connections including encoding, multiplexing, synchronization, clock recovery and serialization of the data on the wire for whatever speed/type of Ethernet interface is configured. Operation of the PHY complies with the IEEE 802.3 standard. The PHY layer transmits/receives the electrical signal to/from the transceiver where the signal is converted to light in the case of an optical port/transceiver. In the case of a copper (electrical) interface, e.g., Direct Attach Cable (DAC), the signals are converted into differential pairs.

If a valid bit stream is received at the PHY, the data is sent to the MAC layer. On input, the MAC layer is responsible for turning the bit stream into frames, packets, or another division of network data based on the supported and implemented protocols and standards of the network element. This operation can include performing error checking and finding the start and end delimiters for the unit of network data. In one embodiment, while the entire unit of network data is received at the MAC/PHY layer only header data is sent through to the remainder of the forwarding pipeline 300.

In one embodiment, headers for the unit of network data are parsed at an ingress parser 304, which extracts key fields used to make forwarding decisions. For a typical unit of Internet Protocol version 4 (IPv4) network data, the ingress parser 304 can extract a variety of layer 2, layer 3, and layer 4 headers, including source and destination MAC addresses, source and destination IP addresses, and source and destination port numbers. In one embodiment, the ingress parser 304 also determines the VLAN ID of the unit of network data. Where the unit of network data has arrived via a trunk port, the VLAN ID can be determined based on a VLAN header. When the unit of network data arrives via an access port or arrived untagged, the VLAN ID may be determined based on the port configuration.

In one embodiment, once the ingress parser 304 is aware of the VLAN ID and ingress interface the ingress parser 304 verifies the spanning tree protocol (STP) port state for the receiving VLAN. In one embodiment, the network element supports the rapid spanning tree protocol (RSTP). If the port STP/RSTP state indicates that the unit of network data should be forwarded (e.g., blocking, listening, discarding, learning, etc.) the unit of network data is dropped. If the STP/RSTP state is learning, the MAC address table is populated with information from the unit of network data and the unit of network data is dropped. If the port STP state is forwarding, then the headers for the unit of network data are allowed to proceed down the pipeline.

In one embodiment, the ingress parser 304 can perform a further comparison for the unit of network data against any configured Port ACLs by performing a lookup in the VLAN ACL 323. If the unit of network matches a DENY statement the unit will be dropped. If the unit of network data matches a PERMIT statement, or no port ACL is enabled, the unit of network data is passed to the next block of the pipeline. Successive stages include L2 lookup 306 and an L3 lookup 308 stages. The L2 lookup 306 stage will reference L2 data 325, which may be a MAC address table, which is an exact-match table. The L3 lookup 308 will reference L3 data 326, which includes an exact-match table that contains /32 IPv4 and /128 IPv6 host routes, and a longest-prefix match (LPM) table that contains IPv4 and IPv6 routes that are not host routes.

ACL Processing

Figure 4:
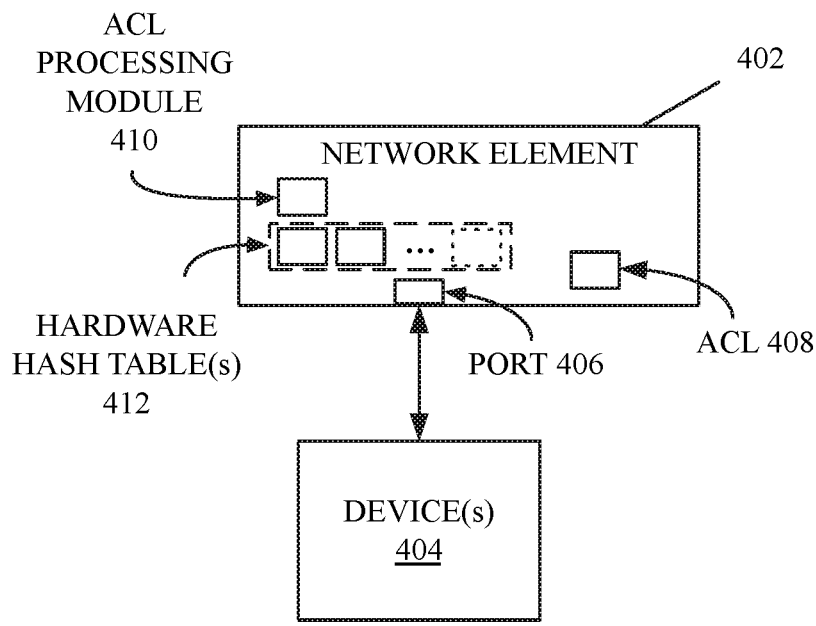
FIG. 4 is a block diagram of an ACL processing system, according to an embodiment.

FIG. 4 is a block diagram of an ACL processing system 400, according to an embodiment. The ACL processing system 400 includes a network element 402 that is coupled to a device 404 via a port 406. The network element 402 can use an ACL 408 to filter network data received via the port 406. The ACL 408 can be any ACL described herein, including the VLAN ACL 323, egress ACL 324, or ingress ACL 327 of FIG. 3. The network element 402 additionally includes an ACL processing module 410, which, in one embodiment, includes hardware to perform ACL processing logic as described herein. The ACL processing module 410 is a specific example of a generalized network data classification module that can be applied generally for use in network data classification and access control. Accordingly, embodiments of the ACL processing module 410 have applications beyond the processing of access control lists and can be generally applied for use in processing lists for use in access classification and control.

In one embodiment the ACL processing module 410 of the network element 402 converts the ACL 408, which may be an ordered ACL, into a contiguous subsections, where each subsection consists of rules with the same mask. An ordered ACL can consist of an ordered series of rules, with each rule having a match criterion and an action. An ACL is applied to a piece of data by evaluating the data against the rules in order and taking the action of the rule that matched. The match criterion for each rule is a pair (V, M), where V is a numeric value up to N bits long and M is a mask of N 0 and 1 bits. A value X matches the rule if (X & M)==(V & M), where "&" is the bitwise "logical and" operator. In one embodiment, the values (X) matched against an ACL are Internet Protocol (IP) v4 or IPv6 addresses, or representations thereof. The address can be a source or destination address. In one embodiment, the (V, M) pairs match subsets of the IPv4 or IPv6 address space and the actions of an ACL are either a "permit" or a "deny". In one embodiment, an ACL be interpreted to include an "implicit deny" rule at the end that is equivalent to "deny (0, 0)".

In an ordered ACL, a preceding rule in the ACL takes precedence over a subsequent rule. With an ordered ACL having possibly hundreds of ordered rules, evaluating the rules for an address for each unit of network data can require expensive hardware, such as a ternary content addressable memory (TCAM) that is used to evaluate the ordered rules. To avoid the use of expensive TCAM hardware, in one embodiment, the ACL processing module 410 converts an arbitrary ACL of ordered rules into contiguous subsections, where each subsection consists of rules with the same mask. The rules in each such subsection are then loaded into one or more hardware hash table(s) 412 that can be referenced to perform lookups of unmasked fields of a network data packet that are associated with the subsection. While in one embodiment, a TCAM be used to store ACL and/or other data, in alternate embodiments, other types of associative data structures can be used (e.g., an associative data structure with a set of entries and masks).

The lookup to the one or more hardware hash table(s) 412 can be used to retrieve an indication of the desired result {permit, deny, set traffic class, set next hop, etc.}. In such embodiment, a TCAM based approach of evaluating ACLs can be replaced by a software/hardware-based approach that includes processing the ACL and performing lookups on the processed ACL using the hash-based ACL lookup offload engine. While in one embodiment, the network element 402 performs the ACL conversion, in alternate embodiments, the ACL conversion is performed by another device (e.g., a network management station (NMS), a software defined network controller, or another device in the network). In one embodiment, the indication of the desired result is used for a packet processing action or logic.

In one embodiment the ACL processing module 410 supports for multiple ACL types including quality of service ACLs, policy based routing ACLs, and security ACLs. The processing results of the different types of ACLs may be differently encoded. In general, the ACL processing logic may be used to perform classification of network traffic that includes policy based routing (PBR) and QoS classification, where PBR and QoS classification rules are processed, grouped into subsections having mutually exclusive rules, and applied to network data by processing the rules in each subsection.

For general classification rules and ACL rules, a key aspect of each subsection is that the rules within a subsection are mutually exclusive. That is, if one rule in a subsection matches, then no other rule can possibly match. For example, if all rules only match on a destination network address, a unit of network data with destination network address (e.g., IP address) 1.2.3.4 will match at most one rule that matches only on IP destination address (e.g., the rule 'IP permit 1.2.3.4 any'). The mutual-exclusion property allows matching without ordering, and thus, without prioritization of the entries in a subsection.

The one or more hardware hash table(s) 412 can be configured to perform lookups based on rule mask groups associated with the subsections generated by the ACL processing module 410. In one embodiment, multiple rules associated with multiple subsections can be loaded into the one or more hardware hash table(s) 412. As the lookups can be performed on a per-mask group basis, multiple sets of hash values associated with multiple subsections can be loaded into one of the one or more hardware hash table(s) and a lookup for rules associated with each subsection can be sequentially performed based on the mask associated with each rule.

In one embodiment, each of the one or more hardware hash table(s) 412 can be loaded with a separate subsection of rules. Packet payload and/or header data can be masked and compared against the rules in each of the one or more hardware hash table(s) 412. In one embodiment the one or more hardware hash table(s) 412 include multiple hash tables configured as a hash table cascade. In such embodiment, the output result of a hash table is used as input to a successive hash table.

In one embodiment, a key property of a subsection is that the rules within a subsection are mutually exclusive. That is, if one rule in a subsection matches, then no other rule can possibly match. For example, if all rules only match on a destination network address, a unit of network data with destination network address (e.g., IP address) 1.2.3.4 will match at most one rule that matches only on IP destination address (e.g., the rule 'IP permit 1.2.3.4 any'). The mutual-exclusion property allows matching without ordering, and thus, without prioritization of the entries in a subsection.

In one embodiment, although all rules in a subsection are dispatched with a single lookup, the rules in a subsection may or may not be "evaluated" in parallel. For example, there is no evaluation of rules that do not match, as there is simply a direct lookup to find the rule that does match, if any such rule exists. Additionally, no operation is performed in which the highest priority rule that matches is selected, as there is either a single match or no match. If any match occurs, that match is taken without consideration of priority, as no other rule in the segment may match. Thus, no consideration of priority takes place. However, in one embodiment prioritization data is maintained such that the matching rules from different subsections can be compared in a rule cascade, such that the highest priority match between different subsections can be compared and the highest priority match between those subsections can be selected for processing.

Specific details of a lookup engine that implements sequential processing of the subsections of an ACL are described in co-pending application Ser. No. 15/272,083, filed on Sep. 21, 2016, which is incorporated by reference. This lookup engine can be extended via additional optimizations described herein. One embodiment enables the use of a TCAM memory to enable simultaneous lookup of multiple singleton (e.g., single entry) mask groups. One embodiment enables dynamic selection of subsequent rule subsections in the cascade based on sequentially previous matches within the subsection cascade. Various combinations of these embodiments may also be implemented.

Mask Group Enhancements Using a TCAM

As ACL rules are grouped into subsections based on common masks, the rules may not be evenly distributed across subsections. Accordingly, some subsections may contain a large number of rules, while other subsections may include fewer rules. In some implementation this may result in one or more hash tables containing as few as a single subsection. In such implementations, these single subsections may include only a single rule. These single rule subsections can be stored in singleton mask groups that are directly indexed.

Figure 5:
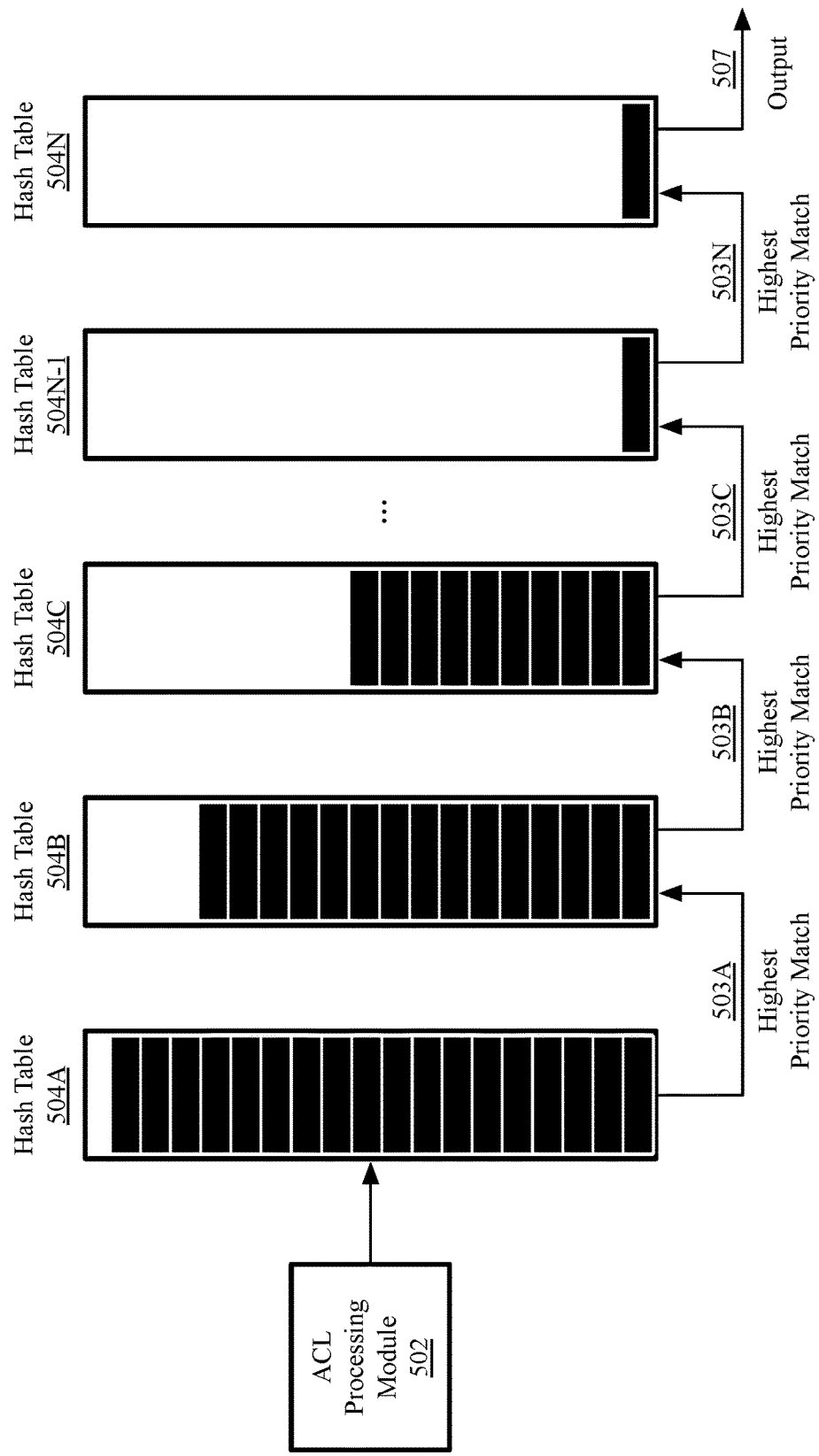
FIG. 5 is an illustration of a system for storing rules generated for hash-based ACL lookup offload, according to an embodiment.

FIG. 5 is an illustration of a system 500 for storing rules generated for hash-based ACL lookup offload, according to an embodiment. The system 500 includes an ACL processing module 502 that processes ACL rules and stores the rules in a set of hash tables 504A-504N. The subsections of rules stored in each hash table are processed. The rules can be processed in a cascade, with the highest priority match 503A-503N from each hash table in the cascade is compared until an output 507 is generated.

Each hash table 504A-504N can include one or more subsections, with each subsection including one or more rules. For example, hash tables 504A-504C store a distribution of one or more subsections including multiple rules. In some implementations, the tail of the rule distribution includes multiple subsections including a single rule. For example, hash tables 504N-1 and 504N each include a single subsection including a single rule, where the single rule subsections can be stored as singleton mask groups that are directly indexed without masking.

Figure 6:
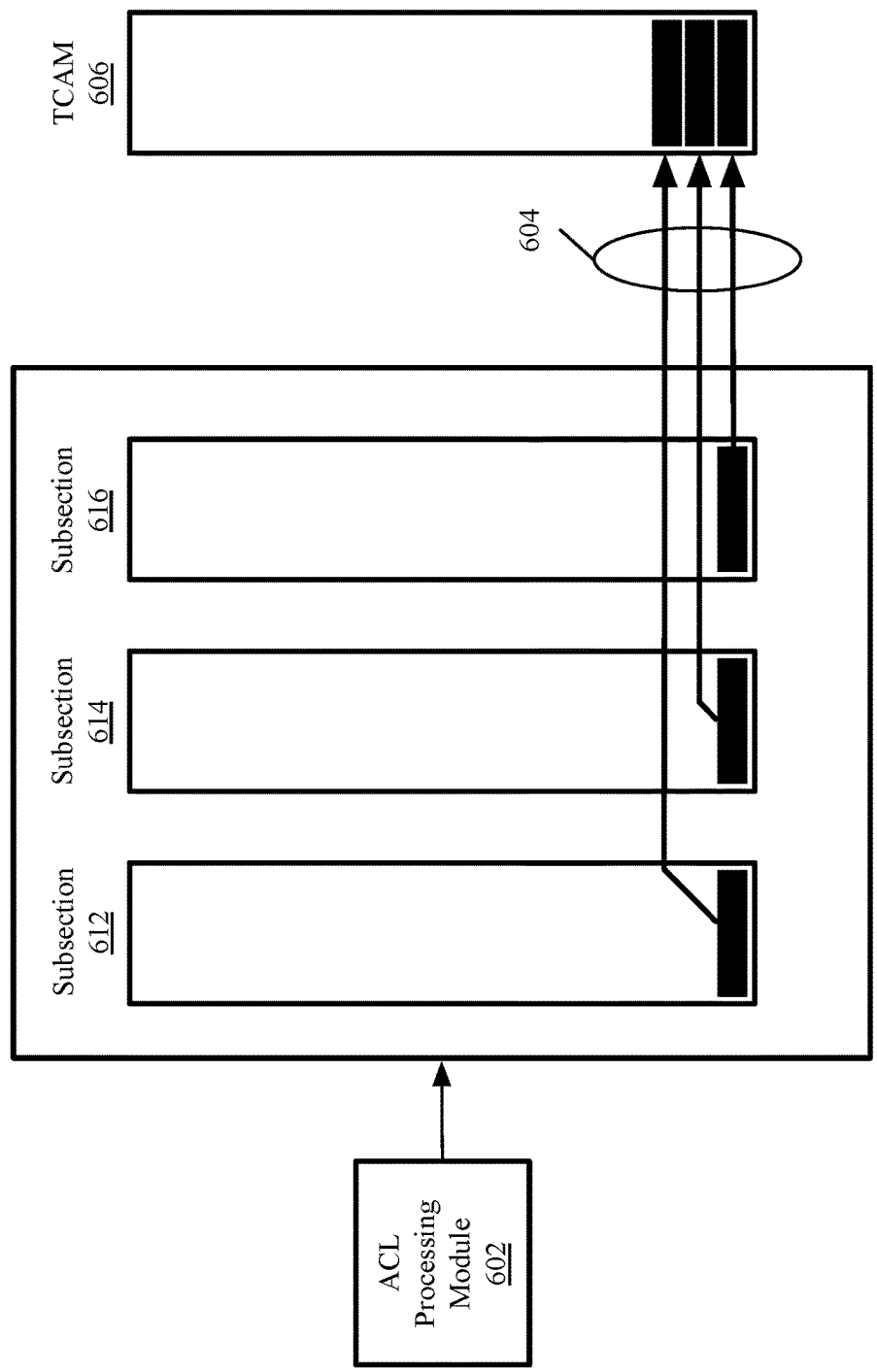
FIG. 6 is an illustration of a system for implementing mask group enhancements, according to an embodiment.

FIG. 6 is an illustration of a system 600 for implementing mask group enhancements, according to an embodiment. The system 600 includes an ACL processing module 602 that is configured to process ACL rules. After the ACL processing module 602 processes the ACL rules, a series of singleton mask groups may be generated that cannot be consolidated into other subsections via consolidation mechanisms such as a semantics preserving mask transformation. In one embodiment, instead of storing the singleton mask groups into separate subsections (e.g., subsection 612, 614, 616), the ACL processing module 602 can store 604 the individual rules into a TCAM 606. The TCAM 606 enables simultaneous evaluation of the multiple rules and can store both the rule and the mask associated with each rule.

Figure 7:
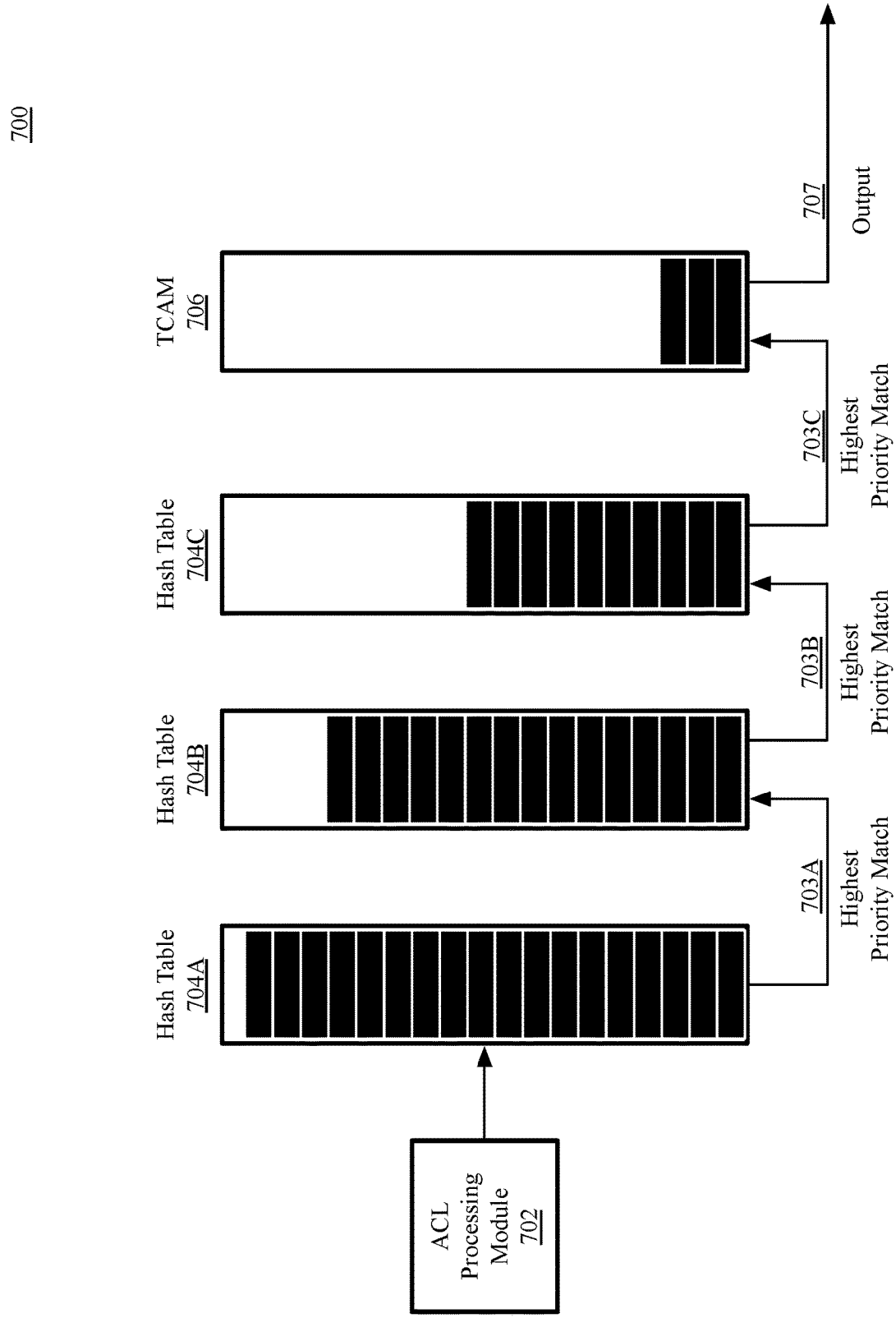
FIG. 7 is an illustration of a hash table ACL offload system, according to an embodiment.

FIG. 7 is an illustration of a hash table ACL offload system 700, according to an embodiment. The hash table ACL offload system 700 includes an ACL processing module 702, multiple hash tables 704A-704C, and a TCAM 706. The rules in the subsections stored in the hash tables 704A-704C can be processed in a cascade in which the highest priority match 703A-703C from each hash table 704A-704C is compared. The TCAM 706 can then be used to process all of the singleton rules in parallel to produce an output 707. The winning rule from the TCAM 706 can be the matching rule having the highest priority among the rules, which can then be compared with the winning rules from the hash tables 704A-704C. The priority of the rules within the TCAM 706 can be determined based on the priority of the rules in the ACL from which the processed rules are derived.

Dynamic Selection of Rule Subsections

In the hash table ACL offload system 700, the result of each comparison stage is compared with results at subsequent stages to produce a final output. Each subsection of rules is a mask group, where all rules in a subsection share a common mask. Each mask group can be associated with a configuration table that lists the network data characteristics (e.g., header fields, data, etc.) within each unit of network data that is compared against the rules in the mask group to find a matching rule. The masks associated with each mask group can select the subset of bits in each unit of network data against which the rules in the mask group will be compared.

In one embodiment, dynamic selection of subsequent rule subsections is enabled, such that based on the winning result of first comparison, the rule subgroups used for subsequent comparisons can be changed. In one embodiment this can be performed by augmenting or modifying a key of a mask group based on the result of previous subsections.

In one embodiment, the rules stored in an ACL can be partitioned into multiple sets of rules, where the different sets of rules are associated with different mask groups. Downstream stages of the hash table cascade can include a union of all maskable fields and a subset of all rules will be compared against the processed network data, where the specific subset of rules is selected based on previous comparisons. This can be used to dynamically select the subsections of rules that are compared against a given unit of network data, which limits the total number of mask groups that are active for each comparison.

Figure 8:
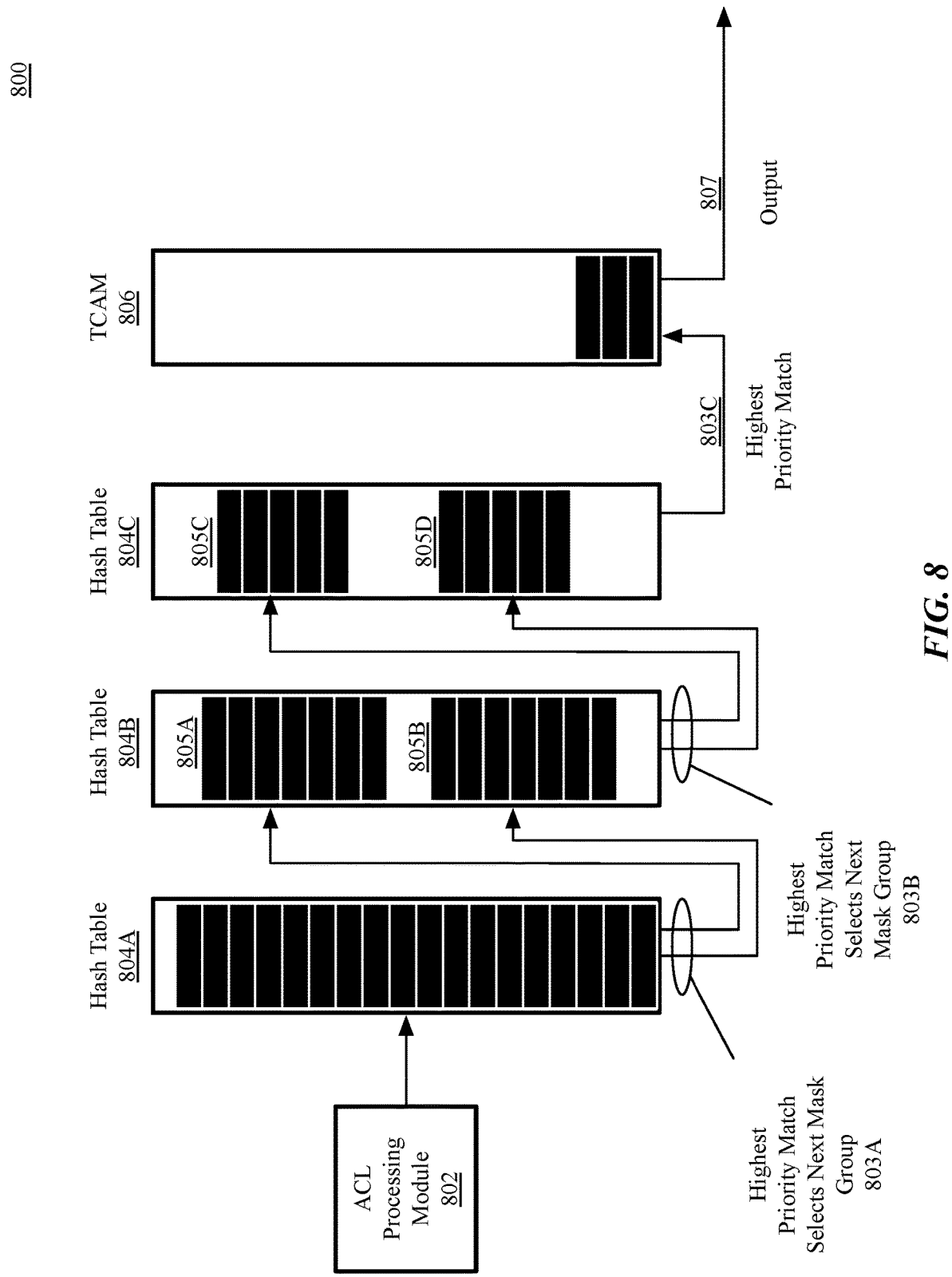
FIG. 8 is an illustration of a system that enables dynamic selection of rule subsections, according to an embodiment.

FIG. 8 is an illustration of a system 800 that enables dynamic selection of rule subsections, according to an embodiment. The system 800 includes an ACL processing module 802 that can process rules stored in an ACL and store the processed rules into a set of hash tables 804A-804C. The system 800, in some embodiments, can also include a TCAM 806 to consolidate multiple singleton mask groups. In operation, one or more subsections of rules in a first hash table 804A can be processed sequentially or in parallel and the highest priority match 803A from the various subgroups in the hash table 804A can be compared with subsequent matching rules in subsequent hash tables (e.g., hash table 804B, hash table 804C).

In one embodiment, the highest priority match 803A from the first hash table 804A can also be used to select the next mask group in the second hash table 804B (e.g., one of mask group 805A or mask group 805B) that will be used in subsequent comparisons. The highest priority match from the selected mask group 803B of the second hash table 804B can then be used to select the next mask group for comparison (e.g., one of mask group 805C or 805D) against the unit of network data, with the highest priority match 803C from the third hash table 804C being used as input to the TCAM 806. The highest priority match 803C from the third hash table 804C can then be compared with any matching results from the TCAM 806 and the highest priority match can be used to generate the output 807 of the system.

At each stage, the mask group selection for the next set of comparisons can be performed based on various characteristics. In one embodiment only rules associated with a specific field can be selected for subsequent comparison stages based on the output of each comparison stage. For example, a first mask group can include rules based on a source IP address. If a unit of network data matches against a specific source IP mask, only mask groups associated with a specific network data characteristic (e.g., TCP port) are used for subsequent comparisons. As an additional example, if an incoming unit of network data uses a specific protocol (e.g., UDP), then only the mask groups containing rules associated with that specific protocol are used for subsequent comparisons. While in one embodiment, the entries of mask groups 805A-D can be stored contiguously, in alternate embodiments, the entries of the mask groups 805A-D can be interleaved in the respective hash tables 804A-B with a key identifying the mask group, and/or some combination therein.

Exemplary Network Element with Classification and Filtering Logic

Figure 9:
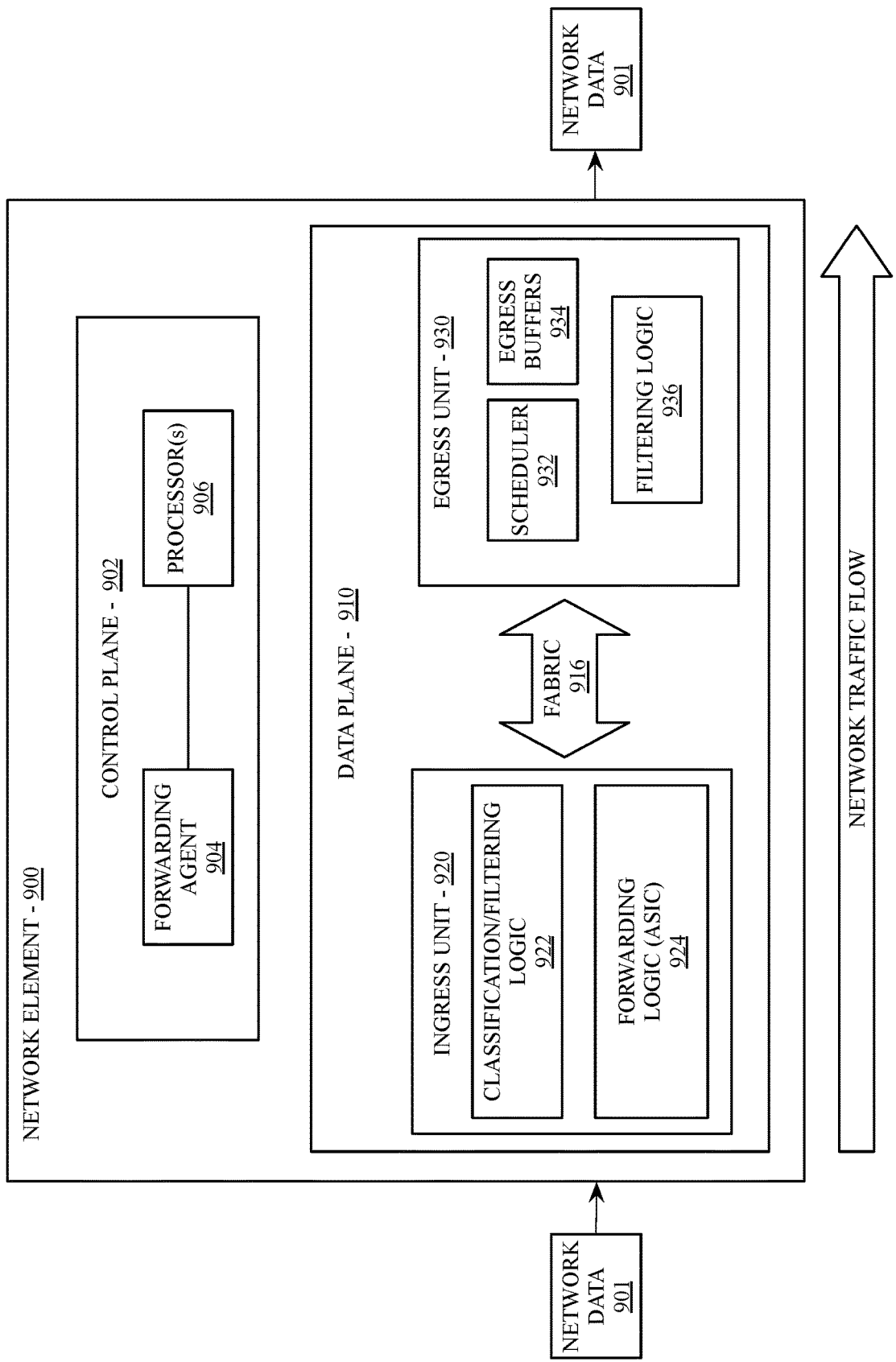
FIG. 9 illustrates logic a network element configured to perform hash based ACL lookup offload, according to an embodiment.

FIG. 9 illustrates logic a network element 900 configured to perform hash based ACL lookup offload, according to an embodiment. In such embodiment, the network element 900 includes a data plane 910 coupled to a control plane 902 having one or more processor(s) 906 and a forwarding agent 904. In one embodiment, the forwarding agent 904 is at least in part a software process executing on the one or more processor(s) 906 of the control plane 902. The processor(s) 906 are dedicated to control plane operations including programming one or more hardware forwarding engines, (e.g., HWFE(s) 206A-C of FIG. 2) such that all forwarding operations for network data occur on the data plane 910.

In one embodiment, the data plane 910 includes an ingress unit 920 and an egress unit 930, which may include logic to perform equivalent operations as those illustrated and described with respect to the forwarding pipeline 300 of FIG. 3. The ingress unit 920 includes various network interfaces and ports (not shown) to receive and process various data headers on units of incoming network data 901, classification/filtering logic 922 to process incoming data according to network data classification rules and/or access control list entries, and forwarding logic 924 to perform address lookups into the forwarding tables provided by the forwarding agent 904. In one embodiment the classification/filtering logic 922 includes the ACL processing module 410 and one or more ACL(s) (e.g., ACL 408) as in FIG. 4. The forwarding logic 924 in the ingress unit 920 of the data plane 910, which may be an application specific integrated circuit (ASIC), is configured to perform line rate forwarding operations to the output ports indicated by the forwarding tables. The classification/filtering logic 922 may also include an ASIC or a field programmable gate array (FPGA) containing hash tables and hash table lookup logic for the ACL lookup offload engine. In one embodiment, at least a portion of the deny rules of the ACLs may be satisfied by the forwarding logic 924 based on drop routes inserted into the routing table. In one embodiment at least some of the forwarding logic 924 operations may be performed by the classification/filtering logic 922.

In one embodiment, after an output port is determined for forwarded network data 901, the data may be buffered before being forwarded to the egress unit (e.g., egress unit 930) associated with the destination port, for example, across a crossbar fabric 916. The egress unit 930, in one embodiment, includes a scheduler 932 to grant scheduling credits to enables the ingress unit 920 to forward units of network data 910 to the egress unit 930. The units of network data 910 may be buffered in egress buffers 934 of the egress unit 930 before the network data 901 is transmitted via a destination port of the network element 900. In one embodiment, filtering logic 936 is also present in the egress unit to perform egress ACL operations.

Exemplary Logic Operations

Figure 10:
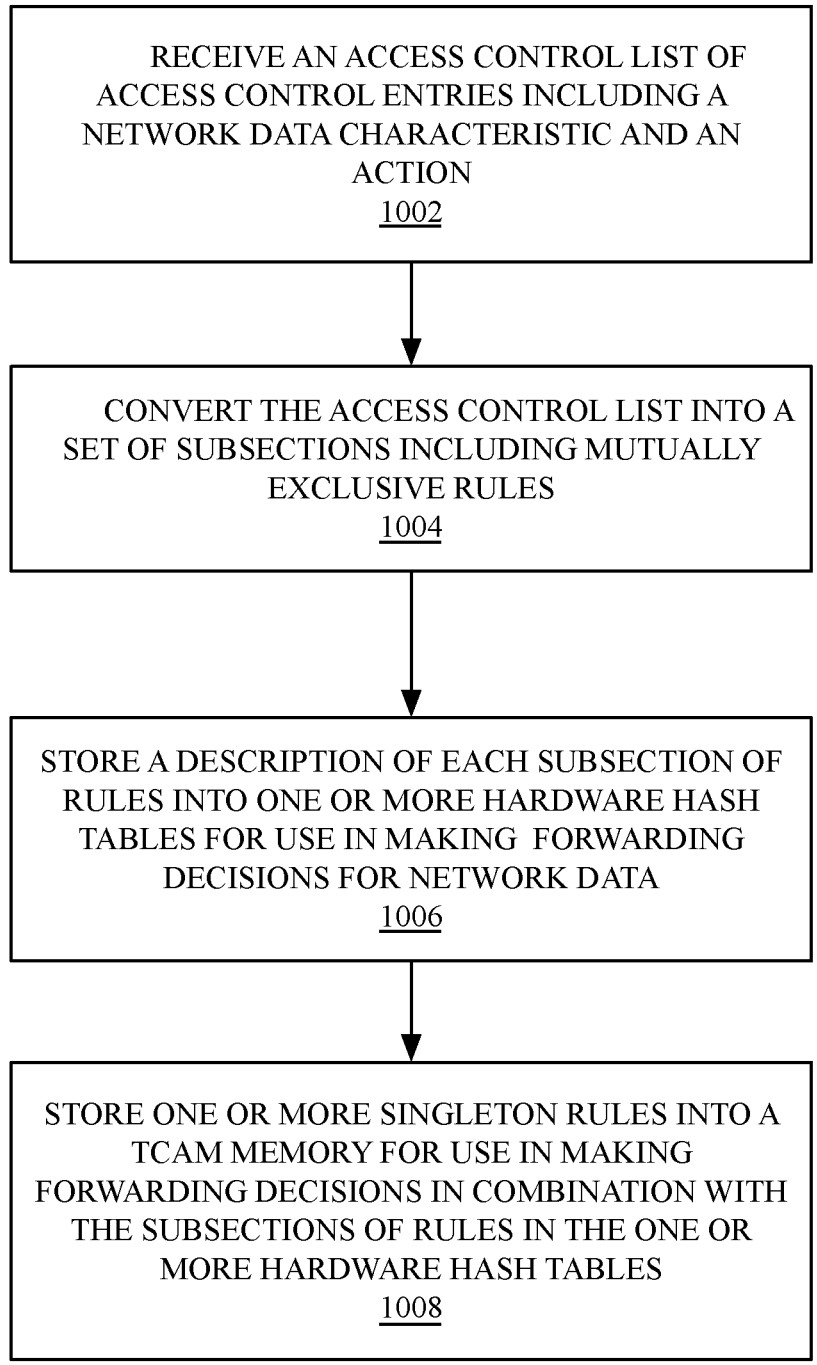
FIG. 10 is a flow diagram of ACL conversion logic, according to an embodiment.

FIG. 10 is a flow diagram of ACL conversion logic 1000, according to an embodiment. The ACL conversion logic can be performed on a network element by the ACL processing module 410 of FIG. 4, the ACL processing module 602 as in FIG. 6, or can be performed by a network management system coupled to the network element over a network. In one embodiment, the ACL conversion logic 1000 is configured to perform operations to receive an access control list of access control entries, where the access control list entries include a network data characteristic and an action, as shown at block 1002. In one embodiment the network data characteristic is an address range. The address range can be one of several types of network address ranges, including layer 2, layer 3, or layer 4 address ranges, including source and destination MAC addresses, source and destination IP addresses, and source and destination port numbers. In one embodiment each address range includes an address field and a mask associated with the address field. The rule generated from the access control entry can include an address range based on or derived from the address range of the access control entry, although a specified address range may be sub-divided into multiple rules. The action can include permitting data associated with an address range, denying deny data associated with an address range, setting a traffic class for the data, or setting a next hop for the data. For a permit rule resulting in a permit action, the permit rule can include a range of addresses associated with network data to be forwarded by the network element. The range of addresses, in one embodiment, may be a range of Internet Protocol (IP) addresses. For a deny rule associated with an action denying data associated with an address range, and deny rule includes a range of addresses associated with network data to be dropped by the network element.

At block 1004 the ACL conversion logic 1000 can convert the access control list into a set of subsections including mutually exclusive rules. Each rule is mutually exclusive of the other rules in a segment, such that a match on a rule precludes a match on any other rule in a segment. Converting the access control list into a set of subsections of rules can include grouping access control entries of the access control list into subsections, where each subsection associated with a single mask. Each unique mask in the access control list is associated with a different segment of rules. Additionally, a prefix preserving or some other semantics preserving transformation can be applied to an access control entry during conversion. For example, transforming the address field using a prefix-preserving transformation can reduce the number of unique masks, and thus the number of segments, such that multiple transformed addresses can be associated with the same mask without affecting the filtering results. In one embodiment, converting the access control list can also include the sub-division of address ranges of the access control list such that the address ranges do not overlap unless an address range is fully nested within another address range. The prefix-preserving transformation and the sub-division of address ranges can be combined such that each mask field value that appears in an access control entry can be assigned a prefix-preserving code that is unique within a subsection. The transformation can be performed such that the set of transformed values have fewer unique masks lengths than the original set of field values of the original access control entries. In one embodiment, this transformation may be performed using a longest prefix match (LPM) data structure.

At block 1006 the ACL conversion logic 1000 can store a description of each subsection of rules. The subsections of rules can then be used by a network element to make forwarding decisions for network data. In one embodiment the description of each subsection includes a transformed address field, a pointer or another identifier for a hash table, and information to interpret the hash table contents. The transformed address field includes transformed data associated with a field (e.g., source IP, destination IP, source TCP port) that is represented as a mask against a predefined flow label for the type of network data associated with the ACL entry. In one embodiment the hash table stores multiple groupings (e.g., buckets) of data and the information to interpret the contents of the hash table includes the number of entries stored in each bucket of data and a mapping is stored that indicates how to unpack the contents of the bucket into the flow label. Once the data describing the processed ACL data is stored, the data can be used by a network element to perform the filtering operations defined by the ACL.

The processing of the rules may result in individual rules with separate masks that cannot be converted or transformed to group those rules into a mask group. Thus, one or more singleton mask groups, each with a single rule, may remain after processing by the ACL conversion logic 1000. To address the singleton mask groups, at block 1008, the ACL conversion logic 1000 can store one or more singleton mask groups into a TCAM memory. The TCAM memory storing the singleton mask groups can be used to make forwarding decisions in conjunction with the subsections of rules stored in the one or more hardware hash tables.

Figure 11:
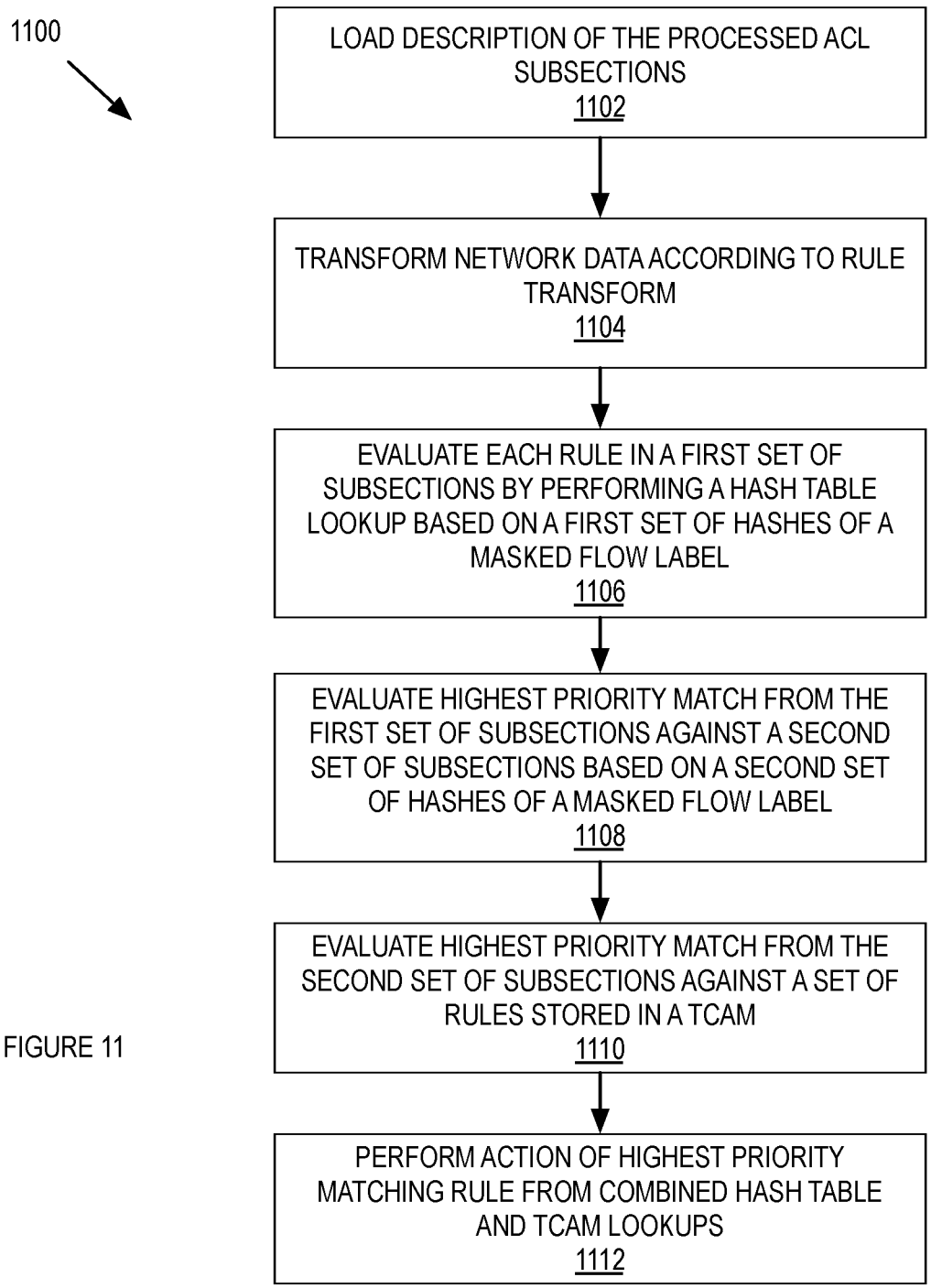
FIG. 11 is a flow diagram of ACL lookup logic, according to an embodiment.

FIG. 11 is a flow diagram of ACL lookup logic 1100, according to an embodiment. In one embodiment the ACL lookup logic 1100 can be performed by an ACL processing module 310 as in FIG. 3, and/or by classification/filtering logic 922 as in FIG. 9, using techniques illustrated for the ACL processing logic 702 of FIG. 7. The ACL lookup logic 1100 can process rule lists for policy based routing and QoS operations in addition to access control. As shown at block 1102, the ACL lookup logic 1100 can load a description of the processed ACL subsections, which may be created using the ACL conversion logic 1000 in FIG. 10. The ACL lookup logic 1100 can transform the network data according to the rule transforms at block 1104. In one embodiment, the rule transforms are the processed ACL subsections and the ACL lookup logic 1100, can be configured to evaluate each rule in a first set of subsections by performing a hash table lookup based on a first set of hashes of masked flow labels, as shown at block 1106. The first set of subsections can be stored in a single hardware hash table or distributed across multiple hardware hash tables. In one embodiment the rules in a subsection are evaluated sequentially. In one embodiment the rules in a subsection are evaluated in parallel. In one embodiment, multiple subsections can be evaluated in parallel. Of the matching rules from the first set of subsections evaluated at block 1106, the ACL lookup logic 1100 can then evaluate the highest priority match from the first set of subsections against a second set of subsections based on a second set of hashes of masked flow labels, as shown at block 1108. In one embodiment the second set of subsections are stored in a different hardware hash table or hash tables than the first set of subsections. The ACL lookup logic 1100 can then evaluate the highest priority match from the second set of subsections against a set of rules stored in a TCAM, as shown at block 1110. The TCAM can store multiple singleton mask group rules for parallel evaluation. The ACL lookup logic 1100 can then perform the action specified by the highest priority matching rule from the combined hash table and TCAM lookups, as shown at block 1112.

Figure 12:
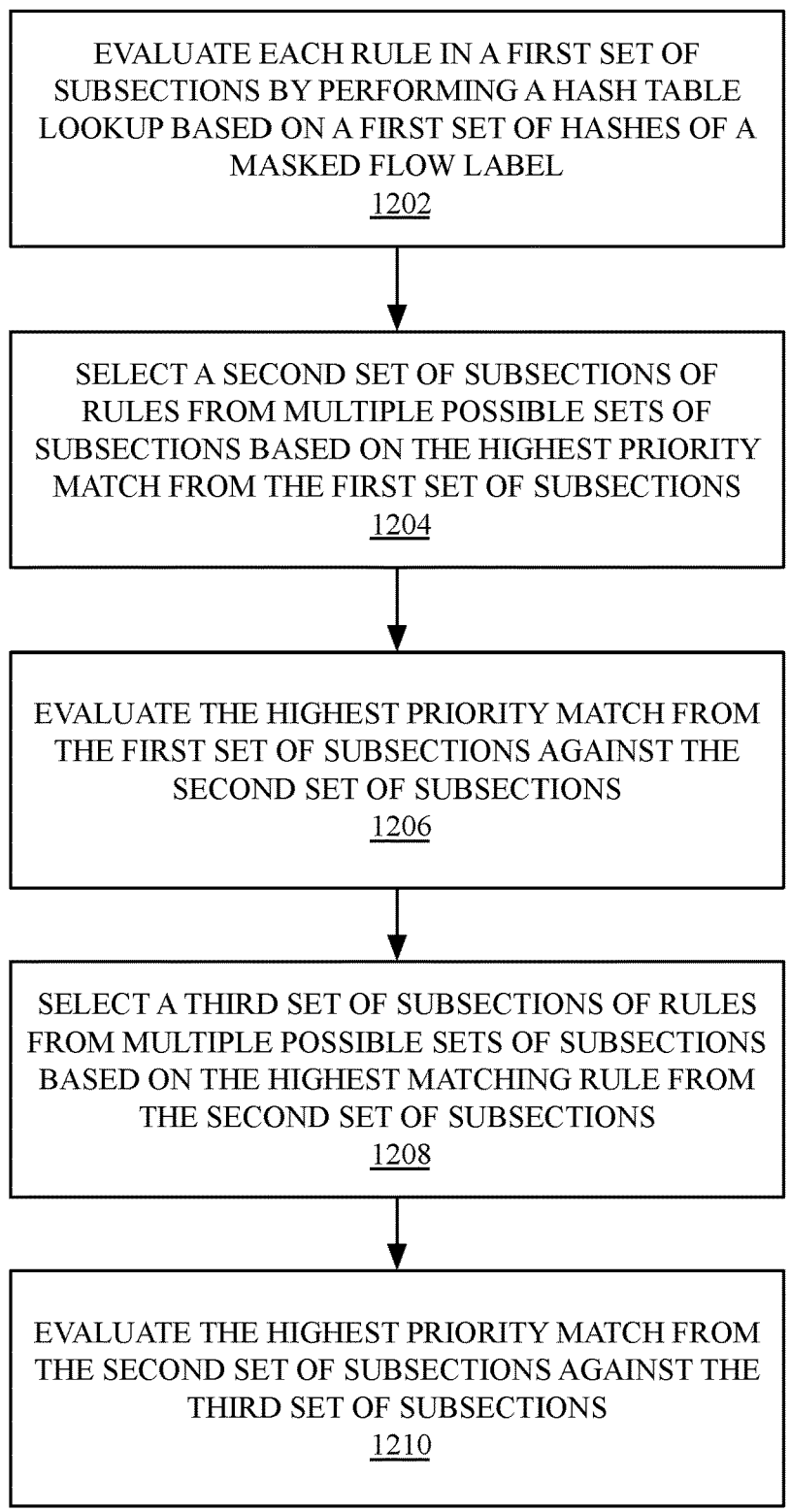
FIG. 12 is a flow diagram of additional ACL lookup logic, according to an embodiment.

FIG. 12 is a flow diagram of additional ACL lookup logic 1200, according to an embodiment. The ACL lookup logic 1200 can be configured to dynamically select successive rules for evaluation in a rule chain. In one embodiment the ACL lookup logic 1200 can be performed by an ACL processing module 310 as in FIG. 3, and/or by classification/filtering logic 922 as in FIG. 9, using techniques illustrated for the ACL processing logic 802 of FIG. 8.

In one embodiment, the ACL lookup logic 1200 can evaluate each rule in a first set of subsections by performing a hash table lookup based on a first set of hashes of a masked flow label, as shown at bloc 1202. The ACL lookup logic 1200 can then select a second set of subsections of rules from multiple possible sets of subsections based on the highest priority match from the first set of subsections, as shown at block 1204. In other words, based on the selected rule from the evaluation performed at block 1202, the subsequent set of rules for evaluation can be selected. The ACL lookup logic 1200 can then evaluate the highest priority match from the first set of subsections against the second set of subsections, as shown at block 1206. The ACL lookup logic 1200 can continue by selecting a third set of subsections of rules from multiple possible sets of subsections based on the highest priority match from the second set of subsections, as shown at block 1208. The ACL lookup logic 1200 can then evaluate the highest priority match from the second set of subsections against the third set of subsections, as shown at block 1210. Subsequent sets of subsections of rules can be dynamically selected based on these techniques. Additionally, a TCAM can be added to the rule cascade, as illustrated in FIG. 6.

Exemplary Data Processing System and Modular Network Element

Figure 13:
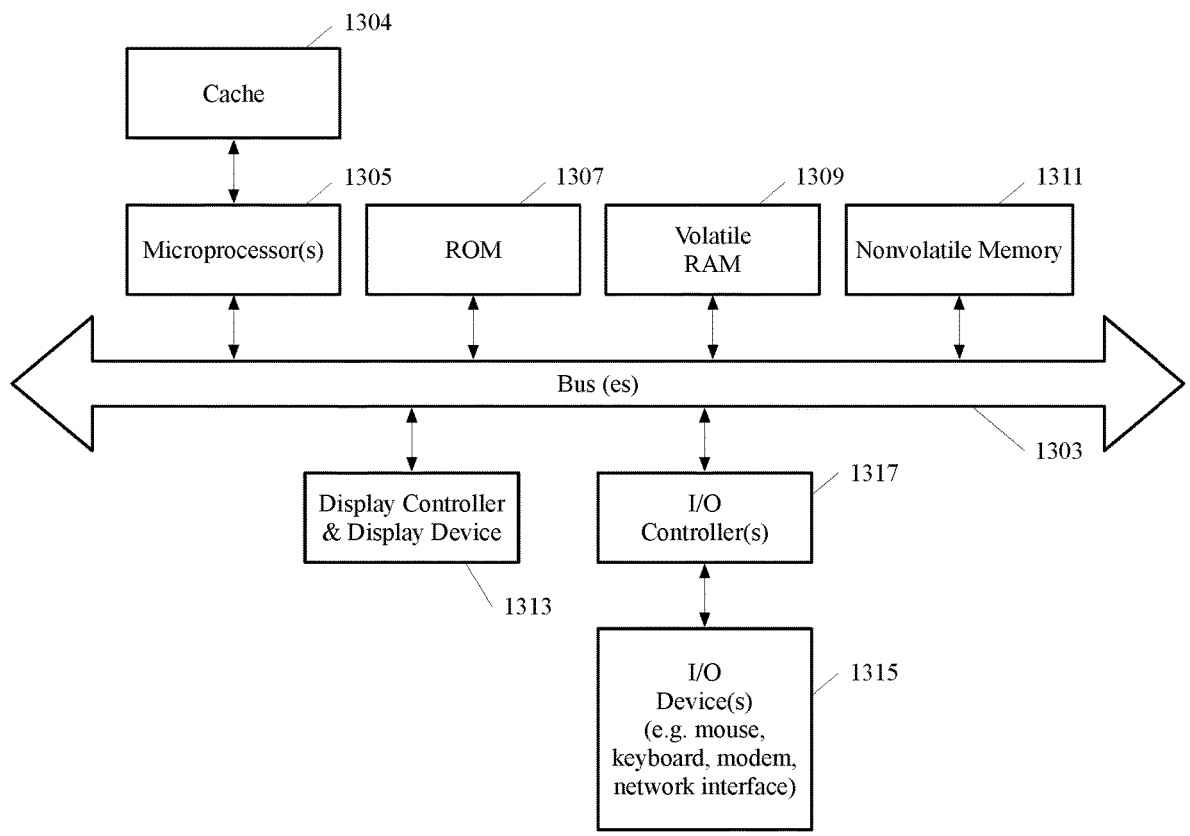
FIG. 13 shows one example of a data processing system that may be used with one embodiment.

FIG. 13 shows one example of a data processing system 1300 that may be used with one embodiment. For example, the data processing system 1300 may be implemented within any one of the network elements described herein, including network element 100 as in FIG. 1. In one embodiment, the data processing system 1300 is used within the control plane of a network element described herein. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 1300 includes one or more bus(es) 1303 which couple to one or more microprocessor(s) 1305, ROM (Read Only Memory) 1307, volatile RAM 1309 and a non-volatile memory 1311. In one embodiment, the one or more microprocessor(s) 1305 couple to a cache 1304, which can include one or more sets of instruction and/or data caches. The bus(es) 1303 may include one or more buses connected to each other through various bridges, controllers and/or adapters as is well known in the art.

The microprocessor(s) 1305 may retrieve the instructions from the memories 1307, 1309, 1311 and execute the instructions to perform operations described above. Instructions and/or associated data retrieved from the memories 1307, 1309, 1311 may be stored in the cache 1304. The bus(es) 1303 interconnect system components with each other, and to a display controller and display device 1313, and to peripheral devices such as input/output (I/O) devices, which may be mice, keyboards, modems, network interfaces, printers and other devices well known in the art. Typically, the input/output devices 1315 are coupled to the system via input/output controller(s) 1317. The volatile RAM (Random Access Memory) 1309 is typically implemented as dynamic RAM (DRAM), which requires power continually in order to refresh or maintain the data in the memory, but may also include static ram (SRAM), which does not require a periodic refresh.

In one embodiment, the non-volatile memory 1311 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 1311 will also be a random access memory although this is not required. While FIG. 13 shows that the non-volatile memory 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, static random access memory, dynamic random access memory, optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link such as a network connection).

Figure 14:
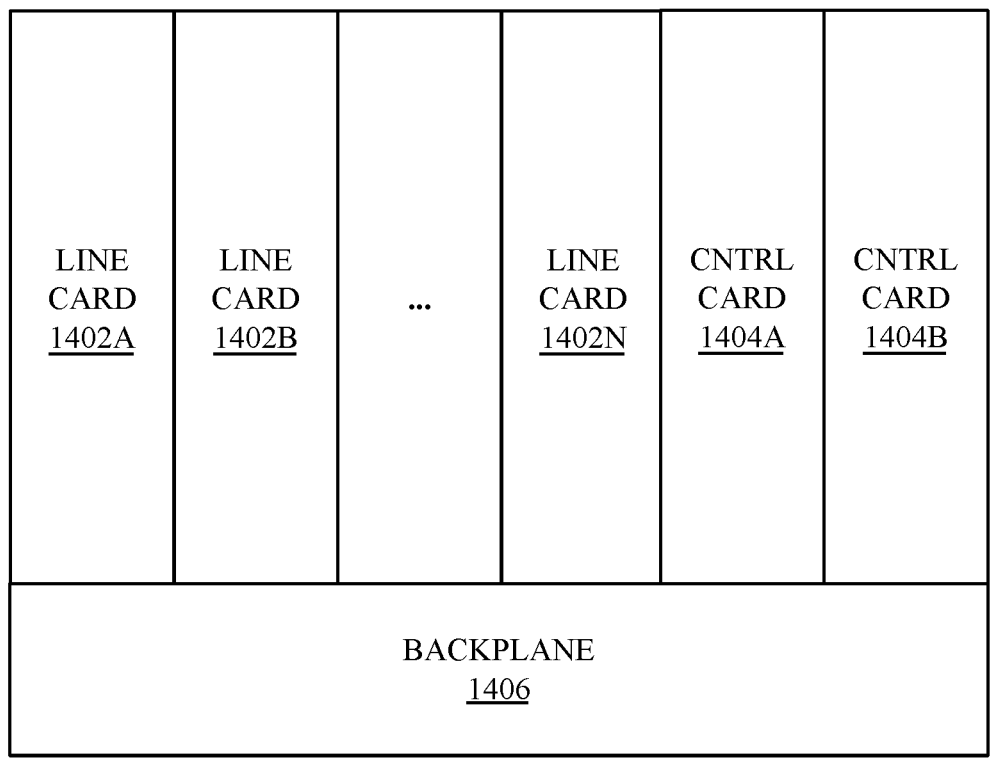
FIG. 14 is a block diagram of a modular network element, according to an embodiment.

FIG. 14 is a block diagram of a modular network element 1400, according to an embodiment. In one embodiment, the network element has a modular and expandable configuration that allows the addition or removal of resources configured as line cards 1402A-N, or controller cards 1404A-B coupled to a backplane 1406. In one embodiment, the controller cards 1404A-B control the processing of the traffic by the line cards 1402A-N, which can each include one or more network data forwarding devices such as interfaces 146A-C as in FIG. 1, although the precise nature of the forwarding devices is not limited as such. In addition, the controller card 1404A-B can collect and possibly aggregate timing data as described in FIG. 13 above. In one embodiment, the line cards 1402A-N process and forward traffic according to the network policies received from controller cards the 1404A-B. In one embodiment, one or more of the line cards 1402A-N can monitor and report internal performance data, such as latency data for all or selected units of network data traversing the network element. In one embodiment, the controller cards 1404A-B can also be configured to perform all or a sub-set of functions provided by the line cards 1402A-N. It should be understood that the architecture of the modular network element 1400 illustrated in FIG. 14 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

Described herein are various embodiments to process and encode access control entries within an access control list and process the encoded access control entries using a hash-based ACL lookup offload engine within a network element.

One embodiment provides for a non-transitory machine-readable medium having executable instructions to cause one or more processing units to perform operations to convert an ordered access control list into a set of contiguous subsections of access control entries, the operations comprising receiving an access control list of access control entries, wherein each of the access control entries includes a network data characteristic and an action; converting a first portion of the access control list into a first set of subsections of rules, wherein each rule of a subsection is mutually exclusive of each other rule in the subsection; storing a second portion of the access control list into a ternary content addressable memory (TCAM); and storing a description of each of the subsections in the set of subsections of rules, wherein the set of subsections of rules is used by a network element to make forwarding decisions for the network data.

One embodiment provides for a network element including an access control list processing module to process an access control list associated of the network element, the access control list processing module to convert the access control list into multiple sets of subsections of rules, each rule of a subsection mutually exclusive of each other rule in the subsection; and forwarding logic to make forwarding decisions for network data received via a port of the network element using the set of subsections of rules, the forwarding logic to evaluate a first set of subsections of rules stored in one or more hardware hash tables and a second set of subsections of rules in a ternary content addressable memory (TCAM).

One embodiment provides for a network processing system including memory to store a processed access control list, the processed access control list including multiple sets of subsections of rules, each rule of a subsection mutually exclusive of each other rule in the subsection; one or more hardware hash table to store hash values associated with one or more of the multiple sets of subsections of rules; one or more processors to apply a transformed access control list to network data within a network element, the processors including logic to load a description of a first subsection of the processed access control list, evaluate each rule in the first subsection by performing a lookup in the hardware hash table for a hash of a masked flow label associated with the network data, load a description of a second subsection of the processed access control list, and evaluate a matching rule from the first subsection against a matching rule from the second subsection; and logic to perform an action on a unit of network data based on a matching rule from the first subsection or the second subsection.

In a further embodiment one or more processors are additionally configured to derive the flow label associated with the network data based on one or more characteristics of the network data. To derive the flow label, the one or more processors can to determine whether a transform is applied to the rules of the subsection and apply the transform to the characteristics of the network data used to derive the flow label. The one or more processors, in response to locating a match in the hardware hash table, are to perform an action on the network data, which is specified by the rule associated with the match. The action can include to permit the network data, deny the network data, set a traffic class for the network data, or set a next hop for the network data. Other actions may also be performed, such as incrementing a counter, applying a policer, applying a load balancing vector, or generally affecting further processing of the packet for the network data. In one embodiment the data plane of the network element is configured to sequentially evaluate each rule in a subsection and forward or drop a unit of network data based on a first matching rule in the subsection. In one embodiment, the rules of each subsection are evaluated in parallel.

Other methods and apparatuses are also described, including various optimizations that may be performed during the processing of the access control list. In one embodiment network data characteristics described herein include an address range, the address range including an address field and a mask, and each rule of a subsection includes an address range. The addresses may be IP addresses, or other forms of addresses, including port addresses such as TCP or UDP port addresses. In one embodiment, a MAC address can be specified.

In one embodiment, converting an access control list into a set of subsections of rules includes grouping access control entries of the access control list into subsections, each subsection associated with a single mask. In one embodiment, converting the access control list additionally comprises reducing a number of unique masks in the access control list by transforming the list of access control entries using a semantics preserving transformation and/or a prefix-preserving transformation. In one embodiment converting the access control list additionally comprises subdividing address ranges of the access control list such that the address ranges do not overlap unless an address range is fully nested within another address range. In one embodiment, storing a description of each of the subsections in the set of subsections of rules includes storing a mask to apply to the fields, an identifier for a hash table, and information to interpret contents of the hash table, wherein the hash table stores multiple groupings of data. In one embodiment, a transformed address field represents one of a source address, a destination address, and source and destination ports. The information to interpret the contents of the hash table can include a number of entries stored in each grouping of data in the hash table and a mapping of data in each entry into a flow label associated with network data.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A non-transitory machine-readable medium having executable instructions to cause one or more processing units to perform operations to convert an access control list into a set of subsections of access control entries, the operations comprising:
receiving an access control list of access control entries, wherein each of the access control entries includes a network data characteristic and an action;
converting a first portion of the access control list into a first set of subsections of rules, wherein each rule of a subsection is mutually exclusive of each other rule in the subsection to allow matching without ordering of the rules;
storing a second portion of the access control list into an associative data structure including a set of entries, wherein each member of the set of entries has an associated mask and each associated mask of each member is different; and
storing a description of each of the subsections in the first set of subsections of rules, wherein the descriptions and the first set of subsections of rules are used by the network element to make a packet processing decision for network data.

2. The non-transitory machine-readable medium of claim 1, wherein the network data characteristic includes an address range, the address range includes an address field and a mask, and each rule of a subsection includes an address range.

3. The non-transitory machine-readable medium of claim 1, wherein converting the access control list comprises reducing a number of unique masks in the access control list by transforming the access control list of access control entries into a transformed list of access control entries.

4. The non-transitory machine-readable medium of claim 3, wherein converting the access control list into the first set of subsections of rules includes grouping the transformed list of access control entries into subsections and each subsection is associated with a single mask.

5. The non-transitory machine-readable medium of claim 3, wherein the transformed list of access control entries is generated using a prefix-preserving transformation or a semantics preserving transformation.

6. The non-transitory machine-readable medium of claim 3, wherein storing the second portion of the access control list into the associative data structure includes, after reducing the number of unique masks in the access control list, storing one or more access control entries into the associative data structure, wherein each rule is associated with a mask.

7. The non-transitory machine-readable medium of claim 3, wherein the instructions cause additional operations comprising:
evaluating network data using the transformed list of access control entries by,
transforming the network data, and
evaluating the transformed network data using the transformed list of access control entries.

8. The non-transitory machine-readable medium of claim 7, wherein evaluating the transformed network data using the transformed list of access control entries has a same result as evaluating the network data using the list of access control entries without transformation.

9. The non-transitory machine-readable medium as in claim 8, the operations additionally comprising converting a third portion of the access control list into a second set of subsections of rules and converting a fourth portion of the access control list into a third set of subsections of rules.

10. The non-transitory machine-readable medium as in claim 9, the operations additionally comprising selecting between the second set of subsections of rules and the third set of subsections of rules based on an evaluation of the first set of subsections of rules.

11. The non-transitory machine-readable medium of claim 7, wherein
evaluating the transformed network data using the transformed list of access control entries comprises:
comparing the transformed network data with the first set of subsections of rules of the access control list; and
comparing the transformed network data with the second portion of the access control list that is stored in the associative data structure.

12. The non-transitory machine-readable medium of claim 1, wherein the first set of subsections of rules of the access control list is stored in a set of one or more hash tables.

13. The machine-readable medium of claim 1, wherein the associative data structure is a ternary content addressable memory.

14. A method to convert an ordered access control list into a set of subsections of access control entries, the method comprising:
receiving an access control list of access control entries, wherein each of the access control entries includes a network data characteristic and an action;
converting a first portion of the access control list into a first set of subsections of rules, wherein each rule of a subsection is mutually exclusive of each other rule in the subsection to allow matching without ordering of the rules;
storing a second portion of the access control list into an associative data structure including a set of entries, wherein each member of the set of entries has an associated mask and each associated mask of each member is different; and
storing a description of each of the subsections in the first set of subsections of rules, wherein the descriptions and the first set of subsections of rules are used by the network element to make a packet processing decision for network data.

15. The method of claim 14, wherein the network data characteristic includes an address range, the address range includes an address field and a mask, and each rule of a subsection includes an address range.

16. The method of claim 15, wherein converting the access control list comprises reducing a number of unique masks in the access control list by transforming the access control list of access control entries into a transformed list of access control entries.

17. The method of claim 16, wherein converting the access control list into the first set of subsections of rules includes grouping transformed list of access control entries into subsections and each subsection is associated with a single mask.

18. The method of claim 17, wherein the transformed list of access control entries is generated using a prefix-preserving transformation or a semantics preserving transformation.

19. The method of claim 17, wherein storing the second portion of the access control list into the associative data structure includes, after reducing the number of unique masks in the access control list, storing one or more access control entries into the associative data structure, wherein each rule is associated with a mask.

20. The method of claim 17, additionally comprising: evaluating network data using the transformed list of access control entries by,
  transforming the network data, and
  evaluating the transformed network data using the transformed list of access control entries.

21. The method of claim 20, wherein evaluating the transformed network data using the transformed list of access control entries has a same result as evaluating the network data using the list of access control entries without transformation.

22. The method of claim 21, additionally comprising converting a third portion of the access control list into a second set of subsections of rules and converting a fourth portion of the access control list into a third set of subsections of rules.

23. The method of claim 22, additionally comprising selecting between the second set of subsections of rules and the third set of subsections of rules based on an evaluation of the first set of subsections of rules.

24. The method of claim 20, wherein evaluating the transformed network data using the transformed list of access control entries comprises:
  comparing the transformed network data with the first set of subsections of rules of the access control list; and
  comparing the transformed network data with the second portion of the access control list that is stored in the associative data structure.

25. The method of claim 14, wherein the first set of subsections of rules of the access control list is stored in a set of one or more hash tables.

26. The method of claim 14, wherein the associative data structure is a ternary content addressable memory.

27. A network element including:
  non-associative memory;
  an access control list processing module to process an access control list associated with the network element, the access control list processing module to convert the access control list into multiple sets of subsections of rules, each rule of a subsection mutually exclusive of each other rule in the subsection to allow matching without ordering of the rules, and to store the subsections of rules in the non-associative memory; and
  packet processing logic to make packet processing decisions for network data received via a port of the network element using the set of subsections of rules, the packet processing logic to evaluate a first set of subsections of rules stored in one or more hash tables and a second set of subsections of rules in an associative data structure including a set of entries, wherein each member of the set of entries has an associated mask and each associated mask of each member is different.

28. The network element of claim 27, the packet processing logic to evaluate a third set of subsections of rules stored in the one or more hash tables, the third set of subsections of rules selected based on evaluation of the first set of subsections of rules.

29. The network element of claim 28, wherein each rule of a subsection is selected from a group comprising a permit rule, a deny rule, a policing rule, a counting rule, a queue selection rule, a nexthop selection rule, a quality of service rule, and a packet rewrite rule.

30. The network element of claim 28, wherein the packet processing logic is to identify whether a matching rule in a subsection exists and determine if a selected field in a unit of network data matches any rule in a subsection.

31. The network element of claim 29, wherein the packet processing logic is to perform an operation on a unit of network data based on an evaluation of a multiple subsections, wherein a matching rule from a first subsection is evaluated against a matching rule of a second subsection.

32. The network element of claim 31, wherein the packet processing logic is to perform an operation on a unit of network data based on a selection from multiple matching rules, the operation selected based on a comparison of sequence numbers associated with the multiple matching rules.

33. The network element of claim 32, wherein to evaluate each rule in a subsection includes to transform network data to be evaluated based on a transform applied to each rule, wherein the transform applied to each rule is a semantics preserving transformation.

34. The network element of claim 33, wherein the access control list processing module is to apply a transform to a set of rules to reduce a number of unique masks and wherein a subset of rules in the second set of subsections of rules added to the associative data structure have a different mask.

35. The network element of claim 27, wherein the associative data structure is a ternary content addressable memory.

36. A network processing system including:
  memory to store a processed access control list, the processed access control list including multiple sets of subsections of rules, each rule of a subsection mutually exclusive of each other rule in the subsection to allow matching without ordering of the rules;
  one or more hash tables to store hash values associated with one or more of the multiple sets of subsections of rules;
  one or more processors to apply a transformed access control list to network data within a network element, the processors including logic to load a description of a first subsection of the transformed access control list, evaluate each rule in the first subsection by performing a lookup in the hardware hash table using a hash of a masked flow label associated with the network data, load a description of a second subsection of the transformed access control list, and compare a matching rule result from the first subsection against a matching rule result from the second subsection; and
  logic to perform an action on a unit of network data based on a matching rule result from the first subsection or the second subsection.

37. The network processing system as in claim 36, wherein a portion of the memory is an associative data structure including a set of entries and each subsection stored in the associative data structure includes a single rule, wherein each member of the set of entries has an associated mask and each associated mask of each member is different.

38. The network processing system as in claim 37, wherein the associative data structure is a ternary content addressable memory.

39. The network processing system as in claim 36, wherein the one or more processors are additionally to derive a flow label associated with the network data based on one or more characteristics of the network data.

40. The network processing system as in claim 39, to derive the flow label associated with the network data, the one or more processors are to determine a transform applied to the rules of the subsection and apply the transform to characteristics of the network data used to derive the flow label.

41. The network processing system as in claim 36, wherein the logic is to perform an action including to permit the network data, deny the network data, set a traffic class for the network data, set a next hop for the network data, set a policer, increment a counter, or set a packet rewrite action.

42. The network processing system as in claim 41, wherein the action additionally includes to increment a counter, apply a policer, or apply a load balancing vector.

* * * * *